United States Patent

Matsumoto

(10) Patent No.: US 7,112,548 B2
(45) Date of Patent: Sep. 26, 2006

(54) ARTIFICIAL ORE AND COATING MATERIAL OR REFRACTORY BLOCK CONTAINING THE ARTIFICIAL ORE

(76) Inventor: Hatsuichi Matsumoto, 538-1, Ohaza Minamisato, Shimemachi, Kasuya-gun, Fukuoka (JP) 811-2207

( * ) Notice: Subject to any disclaimer, the term of this patent is extended or adjusted under 35 U.S.C. 154(b) by 0 days.

(21) Appl. No.: 10/473,827

(22) PCT Filed: Mar. 29, 2002

(86) PCT No.: PCT/JP02/03238

§ 371 (c)(1),
(2), (4) Date: Sep. 30, 2003

(87) PCT Pub. No.: WO02/079093

PCT Pub. Date: Oct. 10, 2002

(65) Prior Publication Data

US 2004/0116273 A1    Jun. 17, 2004

(30) Foreign Application Priority Data

Mar. 30, 2001 (JP) ............................ 2001-101448
Dec. 27, 2001 (JP) ............................ 2001-396490

(51) Int. Cl.
C04B 35/01 (2006.01)
C04B 35/15 (2006.01)
(52) U.S. Cl. .................................... 501/115
(58) Field of Classification Search ................ 501/115
See application file for complete search history.

(56) References Cited

U.S. PATENT DOCUMENTS

| | | | | |
|---|---|---|---|---|
| 4,193,975 A | * | 3/1980 | Kotval et al. | 423/348 |
| 5,112,698 A | * | 5/1992 | Horvei et al. | 428/632 |
| 5,763,341 A | * | 6/1998 | Pavlov et al. | 501/39 |
| 2002/0177516 A1 | * | 11/2002 | Jantzen et al. | 501/72 |

FOREIGN PATENT DOCUMENTS

| | | | |
|---|---|---|---|
| JP | 49036712 A | * | 4/1974 |
| JP | 51-114319 | | 10/1976 |
| JP | 51-144322 | | 12/1976 |
| JP | 57-126907 | | 8/1982 |
| JP | 63-100156 | | 5/1988 |
| JP | 63-206466 | | 8/1988 |
| JP | 64-70129 | | 3/1989 |
| JP | 6-115927 | | 4/1994 |
| JP | 11-106853 | | 4/1999 |

* cited by examiner

*Primary Examiner*—Elizabeth D. Wood
(74) *Attorney, Agent, or Firm*—Jordan and Hamburg LLP

(57) ABSTRACT

An artificial ore, characterized in that it is prepared by melting one of silicon, a silicon compound, tourmaline and a ceramic, and adding iron, aluminum and calcium into the resultant melt to melt them, followed by cooling to a mass. The artificial core has good thermal properties such as heat conductivity, heat diffusion coefficient and fire resistance temperature, can dissociate molecules in a liquid, and further can prevent the electrification by static charge and the transmission of an electromagnetic wave.

2 Claims, 1 Drawing Sheet

| Sample No. | Heat Diffusion Coefficient ($10^3 m^2/s$) | Heat Capacity (J/g/K) | Density (g/cm$^3$) | Heat Conductivity (W/m/K) |
|---|---|---|---|---|
| A-1 | 0.8172 | 0.7468 | 2.25 | 137.057 |
| A-2 | 0.8205 | 0.7197 | 2.27 | 134.229 |
| B-1 | 0.7155 | 0.7484 | 2.15 | 115.082 |
| B-2 | 0.7286 | 0.7120 | 2.18 | 113.119 |

Figure 1

| Sample No. | Heat Diffusion Coefficient ($10^3 m^2/s$) | Heat Capacity (J/g/K) | Density (g/cm$^3$) | Heat Conductivity (W/m/K) |
|---|---|---|---|---|
| A-1 | 0.8172 | 0.7468 | 2.25 | 137.057 |
| A-2 | 0.8205 | 0.7197 | 2.27 | 134.229 |
| B-1 | 0.7155 | 0.7484 | 2.15 | 115.082 |
| B-2 | 0.7286 | 0.7120 | 2.18 | 113.119 |

ARTIFICIAL ORE AND COATING MATERIAL OR REFRACTORY BLOCK CONTAINING THE ARTIFICIAL ORE

TECHNICAL FIELD

The present invention relates to an artificial ore and a coating material or a refractory block containing the artificial ore.

BACKGROUND TECHNOLOGY

Hitherto, a ceramic has been used extensively as a material having a good resistance to heat and a high degree of hardness. Such a ceramic is prepared by admixing raw materials such as alumina or the like and molding it, followed by sintering. The ceramic can be formed into various shapes upon molding so that it can be used for wide purposes.

Alumina as a representative ceramic has thermal properties including heat resistance of approximately 1,600° C., thermal conductivity of 36.0 (W/m/K), and a heat diffusion coefficient of $0.0119 \times 10^3$ (m$^2$/s) (each value being measured at 300 K).

Although the conventional ceramic as described above has been used in a wide range of fields due to its heat resistance, anti-wearing property, readiness for processing and so on, the development of an artificial raw material having further improved thermal properties such as heat resistance has been desired.

Moreover, the conventional ceramic as described above has to be sintered after molding a mixture of the raw materials so that it requires a long time and a labor for the preparation thereof. Therefore, the development of an artificial ore easy for preparation has been desired.

DISCLOSURE OF THE INVENTION

The present invention is directed to an artificial ore that is prepared by melting silicon and adding iron, aluminum and calcium to the resultant melt, followed by cooling it. Then, the cooled melt is melted again at a high temperature and then allowed to cool to a mass.

The present invention is also directed to an artificial ore that is prepared by melting siliceous compound and adding iron, aluminum and calcium to the resulting melt, followed by cooling it. Then, the cooled melt is melted again at a high temperature and then allowed to cool to a mass.

The present invention is further directed to an artificial ore that is prepared by melting tourmaline and adding iron, aluminum and calcium to the resultant melt, followed by cooling it. Then, the cooled melt is melted again at a high temperature and then allowed to cool to a mass.

Moreover, the present invention is directed to an artificial ore that is prepared by melting a ceramic and adding iron, aluminum and calcium to the resultant melt, followed by cooling it. Then, the cooled melt is melted again at a high temperature and then allowed to cool to a mass.

Furthermore, the present invention is directed to a product obtained by adding charcoal, titan dioxide or "bakuhanseki" (aluminum silicate sintered product) to each of the artificial ores obtained above.

In addition, the present invention is directed to a coating material prepared by crushing each of the artificial ores obtained above and adding the crushed ore to a coating material.

The present invention is further directed to a mass prepared by crushing each of the artificial ores obtained above and molding the crushed ore under pressure.

BRIEF DESCRIPTION OF THE DRAWING

FIG. 1 is a table indicating results of measurement of an artificial ore according to the present invention for thermal diffusion coefficient at ambient temperature (22° C.), heat capacity, density and thermal conductivity.

BEST MODE FOR CARRYING OUT THE INVENTION

The artificial ore as claimed in the present invention is an artificial ore that is prepared by melting silicon in a powdery form under substantially vacuum conditions and adding iron, aluminum and calcium, each in a powdery form, to the resultant silicon melt, followed by cooling the resultant melt. The cooled melt is then melted again at a high temperature and allowed to cool to a mass.

As a raw material, there may be used quartz sand, tourmaline or a ceramic, in place of silicon.

The artificial ore is extremely good in thermally physical values such as thermal conductivity, heat diffusion coefficient, refractory temperature and so on. The artificial ore also has the ability to make molecules in a liquid loose due to a wave motion discharging therefrom. Moreover, the artificial ore has the ability to prevent electrification of static electricity as well as to prevent the permeation of electromagnetic waves or radioactive rays.

Therefore, as ice is placed on top of the artificial ore at ambient temperature, the ice can melt in an extremely short time, thereby uniformly cooling the artificial ore as a whole to the temperature substantially equal to the temperature of the ice. On the other hand, if a portion of the artificial ore is heated, the heated portion of the artificial ore is caused to rise its temperature so rapidly, however, the artificial ore is heated as a whole in an almost uniform manner. As described above, the artificial ore has the ability to absorb the temperature of a thing that comes into contact therewith so that it can be used as a heat-accumulating material.

Further, the artificial ore can discharge a wave motion, and the wave motion can make molecules in a liquid loose as well as ionize into minus ions. For example, this can transform plus ions contained in water into minus ions and render water molecules loose into a cluster, thereby removing a malodor and replacing it with favorite smell. In addition, the artificial ore can prevent the deterioration of water. Moreover, as one wears an accessory made out of the artificial ore, such as a necklace, an arm wrist ring, a knob, etc.) a flow of the blood of the wearing person can be improved thereby preventing a stiff back. Furthermore, the quality of a soil can be improved by pulverizing the artificial ore to grains and imbedding them into the soil. It is to be provided herein that the wave-motional activity can be exhibited even if a thing would not be in direct contact with the artificial ore, in other words, even if the artificial ore would be mounted outside a container without allowing water to come into contact with the artificial ore.

By repeating the melting operations in the course of manufacturing the artificial ore, impurities can be removed from the artificial ore, thereby increasing thermal and wave-motional properties.

Moreover, when charcoal is added to the artificial ore, the deodorizing action can be performed. On the other hand, the addition of titanium dioxide can provide the artificial ore with an anti-bacterial action and a bacteria-removing action, thereby prolonging the life of the artificial ore. Furthermore, the addition of "bakuhanseki" (aluminum silicate sintered product)" to the artificial ore can produce the water-cleaning action.

In accordance with the present invention, the artificial ore prepared in the manner as described above is pulverized into grains and the grains can be added to a coating material together with a solvent.

The resulting coating material can readily coat the artificial ore. When charcoal is added to the artificial ore, a malodor generating from a thinner can be removed.

Furthermore, the artificial ore produced by the above process can be sprayed onto the surface of a material by flame spray coating the artificial ore with plasma by crushing it.

By coating or spraying the surface of a matter with the artificial ore in the manner as described above, the artificial ore can be readily deposited on the surface of a carburetor, a main engine body, a radiator, an exhaust pipe and so on of an internal combustion machine such as a gasoline engine or a diesel engine. This can raise a combustion efficiency and burn a fuel to an almost complete extent decreasing the concentrations of HC and CO in the exhaust gas to substantially zero. This artificial ore can absorb the heat generating from the main engine body, the radiator and so on due to its thermal properties, thereby decreasing a rise of the temperature in the main engine body, the radiator and so on. Further, the wave-motional properties of the artificial ore can make the molecular structure of a fuel or air minute.

The deposition of the artificial ore on the surfaces of fins of a cooling fan can decrease the temperature of a fluid passing through the surfaces of the fins thereof, thereby increasing a cooling efficiency of the cooling fan (it is confirmed that the temperature of air was lowered by 3° C.).

Moreover, the artificial ore can be used intact as a circuit substrate because it has a high electrical resistance. Further, the coating of the surface of the circuit substrate with a coating material can absorb the heat on the circuit substrate, thereby preventing breakage and failure of electrical parts in advance due to a temperature rise. When a speaker is coated with such a coating material, noises generating from the speaker can be removed.

The coating of the surface of a housing member (an exterior member) of electrical products such as portable telephones, television sets, radio sets, computers, electronic ranges and so on with the coating material can prevent the charge of static electricity as well as the penetration and leakage of electromagnetic waves. This can further remove noises.

When bath tubs, pans, and china are coated on their surfaces with the coating material, water staying inside can be prevented from decaying.

Moreover, when a clothing is coated with the coating material, the charge of static electricity and the penetration of electromagnetic waves can be prevented.

In accordance with the present invention, a refractory block in a mass form can be prepared by crushing the artificial ore produced by the above process and molding the crushed artificial ore under pressure.

It is confirmed that the resulting block can withstand at temperature higher than 1,600° C. Therefore, it can be used as an interior lining member for a fusion furnace and a chimney.

In addition to the above, when an engine casing for an internal combustion engine is prepared from the artificial ore or when the artificial ore is coated on the surface inside and outside the engine casing thereof, a rise of the temperature inside the engine can be prevented due to the endothermic action of the artificial ore. Further, when brake disks for a bicycle or a motor cycle are made of the artificial ore or when the artificial ore is deposited on the surface of the brake disks thereof, a decrease in the braking action resulting from a rise of temperature can be prevented in advance due to the endothermic action of the artificial ore.

Furthermore, when a disposal vessel of a raw waste disposal machine is made of the artificial ore according to the present invention or when the disposal vessel thereof is coated with the artificial ore, the treatment of raw waste can be accelerated due to the endothermic action of the artificial ore. Further, when a cartridge of a water purifying unit is made of the artificial ore, the quality of water can be improved due to the action of decomposing the molecules of the artificial ore.

Moreover, when a building material including but being not limited to wall materials, fens materials and so on for a building of electrical factories and telephone offices, which can discharge electromagnetic waves, is made of the artificial ore according to the present invention or when the artificial ore is deposited on the surfaces of the building materials, the electromagnetic waves outside from the building can be prevented from leaking due to the blocking action of the electromagnetic waves. In addition, the blocking action of radiation by the artificial ore can prevent the leakage of the radiation outside from the building.

When an exhaust pipe for discharging exhaust gas generated from the inside of the engine outside therefrom is made of the artificial ore according to the present invention or when the artificial ore is deposited on the inner or outer surface of the exhaust pipe, the discharge of hazardous materials can be prevented due to the action of decomposing the molecules of the artificial ore.

On the other hand, when a conveyor belt of a belt conveyor is made of the artificial ore according to the present invention or when the artificial ore is deposited on the surface of the conveyor belt thereof, the quality of food to be conveyed with the conveyor belt can be sustained in a better state due to the action of decomposing the molecules of the artificial ore.

In addition, when the artificial ore according to the present invention is coated on the surface of a sheet, the temperature of a person's body can be maintained at a generally constant level due to the endothermic action of the artificial ore. Furthermore, when such a sheet is used on a surgery bed, a rise in the temperature of a patient under surgery can be prevented. If the artificial ore is used for the inside of a comb, the early decay of a dead body can be prevented.

The following is a detailed specific description of the examples of the present invention.

EXAMPLE 1

Eighty percent (80%) by weight of silicon in a powdery form was charged in a vacuum fusion furnace heated to 1,650° C. to 1,680° C. under virtually vacuum conditions. Thereafter, 5% by weight of powdery iron, 5% by weight of powdery aluminum and 5% by weight of powdery calcium were charged in this order at the intervals of 3–5 minutes and mixed with one other under stirring, and a molten material was withdrawn from the vacuum fusion furnace. The molten material was then allowed to stand at ambient temperature under natural conditions to form an artificial ore in a mass state.

Thereafter, the artificial ore in the mass form was molten again in the vacuum fusion furnace heated to 1,750° C. to 1,800° C. in a generally vacuum state to yield a melt that in turn was withdrawn from the furnace and allowed to stand naturally at ambient temperature forming the artificial ore in the form of a mass.

The artificial ore in the mass form was further molten again in the vacuum fusion furnace heated to 2,000° C. to 2,050° C. in a generally vacuum state to yield a melt that was then withdrawn from the furnace and allowed to stand naturally at ambient temperature forming the artificial ore in the form of a mass.

As described above, the artificial ore was subjected to repeated melting processes at gradually higher temperatures, which included cooling the mixture after melting and melting the molten mixture again at higher temperature.

For the artificial ore produced in the manner as described above, the thermal diffusion coefficient, heat capacity, density, and thermal conductivity of the artificial ore at ambient temperature (22° C.) are indicated in FIG. 1.

FIG. 1 indicates samples (Sample No. A-1 and No. A-2) formed by thrice melting processes and samples (Sample No. B-1 and No. B-2) formed by twice melting processes.

As shown in Table 1, it is found that the artificial ore according to the present invention has a thermal conductivity higher by 3.5 times and a thermal diffusion coefficient higher by 8 times the conventional alumina ceramic.

The fire-proof tests have been conducted for the artificial ore according to the present invention and it was found that the fire-proof temperature was higher than 1,600° C.

From the above description, it is found that the artificial ore according to the present invention is superior in its thermal properties to the conventional alumina ceramic.

Referring back to FIG. 1, the comparison of Sample Nos. A-1 and A-2 with Sample Nos. B-1 and B-2 indicates that Sample Nos. A-1 and A-2 have the thermal properties better than Sample Nos. B-1 and B-2. This hints that the repeated melting processes can further improve the thermal properties of the artificial ore. The reason is considered to be based on the fact that the repeated melting processes can remove impurities contained in the artificial ore.

EXAMPLE NO. 2

Eighty percent (80%) by weight of quartz sand (silicon dioxide) in a powdery form as a siliceous compound was charged in a vacuum fusion furnace heated to 2,000° C. to 2,050° C. under virtually vacuum conditions. Thereafter, 5% by weight of powdery iron, 5% by weight of powdery aluminum and 5% by weight of powdery calcium were charged in this order at the intervals of three-five minutes, and the resulting mixture was mixed under stirring to form a molten mixture. The molten mixture was withdrawn from the vacuum fusion furnace, and the molten material was then allowed to stand at ambient temperature under natural conditions to form an artificial ore in a mass state.

The resulting artificial ore in the mass state was then molten again under generally vacuum conditions in the vacuum fusion furnace heated to 2,050° C. to 2,100° C., and the resulting molten mixture was again allowed to stand naturally at ambient temperature yielding an artificial ore in the form of a mass.

Thereafter, the resulting artificial ore in the mass state was molten again under generally vacuum conditions in the vacuum fusion furnace heated to 2,100° C. to 2,150° C., and the resulting molten mixture was again allowed to stand naturally at ambient temperature yielding an artificial ore in the form of a mass.

As described above, the melting process was repeated in such a manner that the artificial ore was allowed to cool after cooling and further molten at a temperature higher than the previous process and thereafter at gradually higher temperatures.

EXAMPLE NO. 3

Eighty percent (80%) by weight of tourmaline in a powdery form was charged in a vacuum fusion furnace heated to 800° C. to 1,000° C. under virtually vacuum conditions. Thereafter, 5% by weight of powdery iron, 5% by weight of powdery aluminum and 5% by weight of powdery calcium were charged in this order at the intervals of three to five minutes, and the resulting mixture was mixed under stirring to form a molten mixture. The molten mixture was then discharged from the vacuum fusion furnace, and the molten material was then allowed to stand at ambient temperature under natural conditions to form an artificial ore in a mass state.

The resulting artificial ore in the mass state was then molten again under generally vacuum conditions in the vacuum fusion furnace heated to 1,100° C. to 1,200° C., and the resulting molten mixture was again withdrawn from the furnace and allowed to stand naturally at ambient temperature yielding an artificial ore in the form of a mass.

Thereafter, the resulting artificial ore in the mass state was molten again under generally vacuum conditions in the vacuum fusion furnace heated to 1,200° C. to 1,300° C., and the resulting molten mixture was then withdrawn from the furnace and allowed to stand naturally at ambient temperature yielding an artificial ore in the form of a mass.

As described above, the melting process was repeated in such a manner that the artificial ore was allowed to cool after cooling and further molten at a temperature higher than the previous process and thereafter at gradually higher temperatures.

EXAMPLE NO. 4

Eighty percent (80%) by weight of a ceramic in a powdery form was charged in a vacuum fusion furnace heated to 2,000° C. to 2,100° C. under virtually vacuum conditions. Thereafter, 5% by weight of powdery iron, 5% by weight of powdery aluminum and 5% by weight of powdery calcium were charged in this order at intervals of three to five minutes, and the resulting mixture was mixed under stirring to form a molten mixture. The molten mixture was discharged from the vacuum fusion furnace, and the molten material was then allowed to stand at ambient temperature under natural conditions to form an artificial ore in a mass state.

The resulting artificial ore in the mass state was then molten again under generally vacuum conditions in the vacuum fusion furnace heated to 2,100° C. to 2,200° C., and the resulting molten mixture was again allowed to stand naturally at ambient temperature yielding an artificial ore in the form of a mass.

Thereafter, the resulting artificial ore in the mass state was further molten again under generally vacuum conditions in the vacuum fusion furnace heated to 2,200° C. to 2,300° C., and the resulting molten mixture was then withdrawn from the furnace and allowed to stand naturally at ambient temperature yielding an artificial ore in the form of a mass.

As described above, the melting process was repeated in such a manner that the artificial ore was allowed to cool after cooling and further molten at a temperature higher than the previous process and thereafter at gradually higher temperatures.

EXAMPLE NO. 5

Charcoal was added in the course of forming the artificial ore by one of the above processes. For example, 80% by weight of silicon in a powdery form was charged in a vacuum fusion furnace heated to 1,650° C. to 1,680° C. under virtually vacuum conditions. Thereafter, 5% by weight of powdery iron, 5% by weight of powdery aluminum, 5% by weight of powdery calcium, and 2% by weight of charcoal as a deodorant were charged into the vacuum fusion furnace in this order at intervals of three to five minutes, and mixed under stirring to form a molten mixture. The molten mixture was then discharged from the vacuum fusion furnace, and the molten material was allowed to stand at ambient temperature under natural conditions to form an artificial ore in a mass state.

It was further confirmed that the artificial ore with charcoal added thereto had deodorizing effects.

EXAMPLE NO. 6

Titanium dioxide was added in the course of forming the artificial ore by one of the above processes. For example, 80% by weight of silicon in a powdery form was charged in a vacuum fusion furnace heated to 1,650° C. to 1,680° C. under virtually vacuum conditions. Thereafter, 5% by weight of powdery iron, 5% by weight of powdery aluminum, 5% by weight of powdery calcium, and 2% by weight of titanium dioxide in a powdery form as an anti-microbial agent were charged into the vacuum fusion furnace in this order at intervals of three to five minutes, and mixed under stirring to form a molten mixture. The molten mixture was then discharged from the vacuum fusion furnace, and the molten material was allowed to stand at ambient temperature under natural conditions to form an artificial ore in a mass state.

It was further confirmed that the artificial ore with titanium dioxide added thereto had anti-microbial and bacteria-removing actions as well as prevented the oxidation of the artificial ore leading to prolonging the life of the artificial ore.

EXAMPLE NO. 7

Aluminum silicate sintered product ("bakuhanseki") was added in the course of forming the artificial ore by one of the above processes. For example, 80% by weight of silicon in a powdery form was charged into a vacuum fusion furnace heated to 1,650° C. to 1,680° C. under virtually vacuum conditions. Thereafter, 5% by weight of powdery iron, 5% by weight of powdery aluminum, 5% by weight of powdery calcium, and 2% by weight of aluminum silicate sintered product ("bakuhanseki") in a powdery form as an anti-bacterial agent were charged into the furnace in this order at intervals of three to five minutes, and mixed under stirring to form a molten mixture. The molten mixture was then discharged from the vacuum fusion furnace, and the molten material was then allowed to stand at ambient temperature under natural conditions to form an artificial ore in a mass state.

It was found that the addition of the aluminum silicate sintered product could improve the ability of the artificial ore for transforming water.

EXAMPLE NO. 8

The artificial ore prepared by one of the above processes was heated to 1,650° C. to form a molten material that in turn was poured into a mold having a given shape and then separated from the mold yielding molded products in a variety of forms. An aggregate or a filler may be added upon molding.

When an accessory (e.g., a necklace, an arm wrist ring or a knob) was prepared as a molded product from the artificial ore, the wearing of such an accessory can accelerate the flow of blood in the body, thereby preventing an occurrence of a stiffness in the shoulders and so on.

This is considered to result from the fact that the artificial ore generates a wave motion and such a wave motion can render molecules in the blood loose and ionize them into minus ions.

Further, when a cartridge for use with a water purifying unit was produced from the artificial ore as a molded product, it is confirmed that water can be purified to improve the quality of water.

This is considered to occur from the fact that a wave motion is generated from the artificial ore and such a wave motion can make water molecules loose and ionized to minus ions.

On the other hand, when an engine casing is produced from the artificial ore as a molded product, it is confirmed that a rise of the temperature within the engine can be prevented.

This is considered to result from the fact that the artificial ore has extremely good levels of heat properties including heat conductivity, heat diffusion coefficient, fire-proof temperature and so on and that it has the endothermic ability of absorbing the heat (the combustion temperature within the engine) from a thing that comes into contact with the artificial ore.

Moreover, when disk brakes for use with automobiles, bikes and so on are produced from the artificial ore as a molded product, it is confirmed that the braking action can prevent a decrease in the braking action in advance due to a rise of the temperature.

This is also considered to result from the fact that the artificial ore has extremely good levels of heat properties including heat conductivity, heat diffusion coefficient, fire-proof temperature and so on and that it has the endothermic ability to absorb the heat from the disk brakes upon contact with the artificial ore.

In addition, when a disposal vessel of a wet refuse disposal device was produced from the artificial ore, it is confirmed that the disposal of wet refuse could be improved.

This is also considered to occur from the fact that the artificial ore has extremely good levels of heat properties including heat conductivity, heat diffusion coefficient, fire-proof temperature and so on and that it has the endothermic ability to absorb the heat from the wet refuse in contact with the artificial ore.

Furthermore, when an exhaust pipe for discharging exhaust gases generating from the inside of the engine into the outside was produced from the artificial ore as a molded product, it is confirmed that noxious materials can be prevented from being discharged from the engine.

This is considered to occur from the fact that the artificial ore generates a wave motion and such a wave motion can make molecules in the exhaust gases loose and ionize them into minus ions.

On the other hand, when a building material such as a wall material or a fence material for a building, e.g., a transformer substation, a telephone station and so on, where electromagnetic waves generate, was prepared from the artificial ore as a molded product, it was confirmed that neither electromagnetic waves nor radiation rays are prevented from being discharged and leaked into the outside from the building.

This is considered to occur from the fact that the artificial ore has the ability to prevent the electrification with static electricity and the permeation of the electromagnetic waves and radiation rays.

Further, when a housing member (an exterior member) for electrical appliances and electronic appliances, including but being not limited to portable telephones, television sets, radio sets, computers, electronic ovens, and so on, was prepared from the artificial ore as a molded product, it was confirmed that the charging with static electricity could be prevented and the permeation and leakage of electromagnetic waves can be prevented as well.

This is considered to result from the ability of the artificial ore to prevent the permeation of the electromagnetic waves.

Moreover, when a conveyor belt for use with a belt conveyor was used from the artificial ore as a molded product, it was confirmed that food being conveyed by the conveyor belt could keep its good quality.

This is due to the fact that the artificial ore generates a wave motion and the wave motion can make the molecules of the food loose and ionize them into minus ions.

In addition, when a heat accumulator for use with an air conditioner was produced from the artificial ore as a molded product, it was confirmed that the heat accumulator could exhibit a sufficient level of a heat-accumulating action.

This is considered to occur from the fact that the artificial ore has extremely good levels of heat properties including heat conductivity, heat diffusion coefficient, fire-proof temperature and so on and that it has the endothermic ability to absorb the heat from a thing that in turn comes in contact with the artificial ore.

On the other hand, when the artificial ore was crushed or pulverized into grains or particles or powders after molding and prepared as a soil conditioner in the form of particles or powders, it was confirmed that the soil with such a soil conditioner embedded therein could accelerate the growth of a plant and keep the good quality of the soil.

This is considered to result from the fact that the artificial ore generates a wave motion and the wave motion can make water molecules in the soil loose and ionize them into minus ions.

EXAMPLE NO. 9

The artificial ore prepared in the manner as described above was then crushed into loose grains or particles and added to a coating material having a thermal resistance together with a thinner as a solute.

The resulting coating material can produce a coating medium that can readily coat the artificial ore.

It can also be noted herein that the addition of a charcoal to the artificial ore can remove a malodor resulting from the thinner.

EXAMPLE NO. 10

The artificial ore prepared in the above process was deposited on the surfaces of various articles. In other words, the coating medium prepared in the above process was coated with a coating brush on the surface of the produced article. The produced article may be immersed in the coating medium. The artificial ore could also be sprayed on the surface of the produced article by crushing the artificial ore prepared in the above process into powders and melting the powdery artificial ore by means of flame spray coating with plasma.

When the coating medium is coated on the surface of a bath tub, a pan and a piece of porcelain, it was confirmed that water present in the inside was prevented from decaying.

This is considered to be based on the fact that the artificial ore generates a wave motion and the wave motion could make water molecules loose and ionize them into minus ions.

By coating the surface of a housing member (an exterior member) of electrical appliances and electronic appliances including but being not limited to portable telephones, television sets, radio sets, computers, electronic ovens and so on with the coating medium, it was confirmed that the charging with static electricity was prevented as well as the permeation and the leakage of electromagnetic waves could be prevented.

This is considered to be based on the ability of the artificial ore to prevent the permeation of electromagnetic waves.

When the coating medium is deposited on the surface of a clothing, the prevention of charging the clothing with static electricity and permeating it with electromagnetic waves was confirmed.

This occurrence is considered to happen due to the ability of the artificial ore to prevent the charging of static electricity and the permeation of electromagnetic waves.

By coating the surface of an audio device such as a speaker and so on with the coating medium, it was confirmed that an occurrence of noises from the audio device could be prevented.

This is considered to occur from the properties of the artificial ore that it can prevent the charging of static electricity and the permeation of electromagnetic waves.

Further, when the coating medium was coated on the surface of an accessory (e.g., a necklace, an arm wrist ring, a knob, etc.) and the resultant accessory was worn, it was confirmed that a flow of blood of the wearing person was accelerated and a stiffness in the shoulders and so on was prevented.

This is considered to be based on the properties of the artificial ore generating a wave motion that can make molecules in the blood loose and ionize them into minus ions.

By coating the surface of an engine casing with the coating medium, the prevention of a rise in the temperature within the engine was confirmed.

This is considered to result from the properties of the artificial ore that it has extremely good levels of heat properties including heat conductivity, heat diffusion coefficient, fire-proof temperature and so on and that it has the endothermic ability of absorbing the heat (the combustion temperature within the engine) from a thing which comes in contact with the artificial ore.

Further, when the coating medium was coated on the surface of a brake disk for an automobile, a bike or the like, it was confirmed that a decrease in the braking action resulting from the rise in the temperature could be prevented in advance.

This is also considered to be based on the fact that the artificial ore has extremely good levels of heat properties, e.g., including heat conductivity, heat diffusion coefficient and fire-proof temperature, and that it has the endothermic ability of absorbing the heat from a thing which comes in contact with the artificial ore.

Moreover, a disposal vessel of a wet refuse disposal device was coated with the artificial ore, it was confirmed that the disposal of wet refuse was improved.

This is also considered to occur from the properties of the artificial ore that has extremely good levels of heat properties including heat conductivity, heat diffusion coefficient, fire-proof temperature and so on and that it has the endothermic ability to absorb the heat (from the wet refuse) when the wet refuse is in contact with the artificial ore.

Furthermore, when an exhaust pipe for discharging exhaust gases generating from the inside of the engine into the outside was coated with the artificial ore, it was confirmed that noxious materials could be prevented from being discharged from the engine.

This is considered to be based on the properties of the artificial ore generating a wave motion that can make molecules in the exhaust gases loose and ionize them into minus ions.

Moreover, when a building material such as a wall material or a fence material for a building, e.g., a transformer substation, a telephone station and so on, where electromagnetic waves were generating, was coated with the artificial ore, it was confirmed that neither electromagnetic waves nor radiation were prevented from being discharged and leaked into the outside from the building.

This is considered to occur from the ability of the artificial ore to prevent the charging with static electricity and the permeation of the electromagnetic waves and radiation rays.

Further, when a housing member (an exterior member) for electrical appliances and electronic appliances, including but being not limited to portable telephones, television sets, radio sets, computers, electronic ovens, and soon, was coated with the artificial ore, it was confirmed that the charging with electricity could be prevented and the permeation and leakage of the electromagnetic waves could be prevented as well.

This is considered to be based on the ability of the artificial ore to prevent the permeation of the electromagnetic waves.

On the other hand, a conveyor belt for a belt conveyor was coated with the artificial ore, it was confirmed that food being conveyed by the conveyor belt could keep its good quality.

This is considered to occur due to the properties of the artificial ore generating a wave motion that can render molecules of the food loose and ionize them into minus ions.

In addition, when the coating medium was coated on the surface of a sheet, it was confirmed that the sheet could keep the temperature of the patient laying on the sheet at a generally constant temperature.

This can prevent a rise in the temperature of the body of the patient during surgery when such a sheet was laid on a surgery bed. Further, the sheet can prevent decaying of a dead body when it was covered in a coffin.

EXAMPLE NO. 11

The artificial ore prepared in the above process was crushed into smaller grains and particles and molded with a 1,500-ton press machine while applying vibrations under a generally vacuum condition. The resulting molded product was then allowed to stand (aged) for 4 hours and to stand overnight under a circumstance at temperature as high as 1,600° C. to 1,650° C., and thereafter it was allowed to cool under natural conditions to form a refractory block in the form of a mass.

Such a refractory block had a fire-proof temperature at 1,600° C. or higher.

INDUSTRIAL UTILIZABILITY

The present invention can artificially produce a material (an ore) having remarkably good levels of values for thermal properties as compared with a ceramic.

The artificial ore according to the present invention has good thermal properties, for example, heat conductivity, heat diffusion coefficient and heat-proof temperature, as well as can make molecules of a liquid loose. Moreover, the artificial ore according to the present invention can prevent charging with static electricity and permeating with electromagnetic waves. Therefore, the artificial ore according to the present invention can be applied to a wide variety of fields.

The invention claimed is:

1. A composition prepared by melting 80% by weight of silicon, a silicon compound, tourmaline or a ceramic and adding 5% by weight of iron, 5% by weight of aluminum and 5% by weight of calcium to the resulting melt, followed by cooling the resulting melt, re-melting it and then cooling it to a mass.

2. The composition as claimed in claim 1, wherein charcoal is added to the composition.

* * * * *